3,555,020
PROCESSES FOR MAKING COMPLEX COMPOUNDS OF HALOBERYLLIUM HYDRIDE WITH TERTIARY AMINES
Lawrence H. Shepherd, Jr., Baton Rouge, La., assignor to Ethyl Corporation, New York, N.Y., a corporation of Virginia
No Drawing. Original application July 3, 1967, Ser. No. 652,652, now Patent No. 3,483,219, dated Dec. 9, 1969. This application Sept. 22, 1969, Ser. No. 860,064
Int. Cl. C07d 87/30
U.S. Cl. 260—247         5 Claims

ABSTRACT OF THE DISCLOSURE

Novel complex compounds of haloberyllium hydride with tertiary amines, such as certain alkyl amines, N,N-dimethylbenzylamine, N,N - dimethylcyclohexylamine, N-methyl or N-ethyl pyrrolidine, N-methyl piperidine and N-methyl morpholine, are prepared (1) by reacting a tertiary amine hydrohalide with a tertiary emine-beryllium hydride complex, (2) from anhydrous beryllium halide and a tertiary amine-beryllium hydride complex, (3) from anhydrous beryllium halide, an alkali metal hydride and an excess of tertiary amine, (4) by halogenation of a tertiary amine-beryllium hydride complex or (5) by hydrohalogenation of a tertiary amine-beryllium hydride complex. The obtained complex compounds are useful as intermediates for the production of pure beryllium hydride, a useful component for propellants. The obtained complexes can be decomposed thermally to pure metallic beryllium, or reacted with olefins or used as selective reducing agents.

---

This application is a division of co-pending application Ser. No. 652,652, filed July 3, 1967 now U.S. Patent 3,483,219.

This invention relates to and has as its principal object the provision of a novel complex compounds of haloberyllium hydrides with tertiary amines and the provision of novel methods for the preparation of such compounds. Other objects will appear hereinafter.

It has now been found that the foregoing objects are accomplished by the provision of haloberyllium hydride amine complexes of the general formula HBeX·A wherein X is a halogen and A a tertiary amine. More specifically, X is a halogen of atomic number from 17 53, inclusive, i.e., chlorine, bromine or iodine, and A may be any of a large variety of tertiary amines of which the following are representative: trimethyl amine, dimethylethyl amine, methyldiethyl amine, triethylamine, dimethylalkyl amine wherein the alkyl group is a saturated straight-chain alkyl radical containing from 3 to 12 carbon atoms, inclusive, N,N-dimethylbenzyl amine, N,N-dimethylcyclohexyl amine, N-methyl pyrrolidine, N - ethyl pyrrolidine, N - methyl piperidine, N-methylmorpholine, tetramethylethylene diamine, triethylene diamine, and tripropylene diamine.

A variety of processes have been discovered for the preparation of the compounds of this invention. These processes are as follows: (1) reaction of a tertiary amine hydrohalide with a beryllumu hydride-tertiary amine complex, hereinafter referred to as the "amine-complex" process; (2) reaction of anhydrous beryllium halide with a beryllium hydride-tertiary amine complex, hereinafter called the "halide-complex" process; (3) reaction of anhydrous beryllium halide with an alkali metay hydride and a tertiary amine, hereinafter called the "halide-hydride" process; (4) halogenation of a beryllium hydride-tertiary amine complex, hereinafter called the "halogenation process"; and (5) hydrohalogenation of a beryllium hydride-tertiary amine complex, hereinafter called the "hydrohalogenation process." Of the foregoing processes, the amine-complex process is preferred because of the ease of purification of the reactants and products and because of the relative stability of the reactants; this simplifies the handling of the reactants and particularly the procedure for weighing them into the reactor.

The foregoing processes will be discussed separately and in detail below.

In general, any tertiary amine complexes of beryllium hydride may be employed as reactants in the foregoing processes. However, beryllium hydride complexes of amines containing more than one tertiary amine radical tend to be polymeric in structure and are therefore less desirable for the purposes of the present invention.

All the operations constituting the above processes are carried out under an atmosphere inert with respect to reactants and products. Because of its cheapness and availability, nitrogen in the inert atmosphere of choice but helium, neon, argon, krypton, xenon, gaseous saturated aliphatic hydrocarbons or other inert gases may be employed if desired.

In the following examples, which illustrate the preparation of the compounds of this invention, all parts and percentages are by weight unless otherwise specified.

Amine-complex process $$R_3N \cdot HX + BeH_2 \cdot NR_3 \rightarrow HBeX \cdot NR_3 + H_2 + HR_3$$

EXAMPLE 1

To a solution containing 7.2 grams of N-methyl pyrrolidine beryllium hydride and 6.4 grams of free N-methyl pyrrolidine in 200 milliliters of benzene, 7.1 grams of trimethylamine hydrochloride was slowly added. Considerable gas was evolved and a homogenous solution was produced. Benzene solvent was removed under vacuum leaving 9.4 grams of a white crystalline solid. A cryoscopic measurement in benzene showed the molecular weight of the solid to be 302. The melting point (uncorrected) in a sealed capillary was 194 to 198° C. The product was anaylzed, with the following results.

| | Found | Theory for N-methyl pyrrolidine chloroberyllium hydride |
|---|---|---|
| H-, millimoles per gram, weight percent | 7.27(0.73) | 7.70(0.77) |
| Be | 8.02(7.22) | 7.70(6.91) |
| Cl | 7.12(25.3) | 7.70(27.2) |
| Amine | 7.57(64.4) | 7.70(65.1) |
| Molecular weight, dimer | 302 | 260 |

The molecular weight indicates that the compound exists as a dimer in benzene solution.

If the N-methyl pyrrolidine in the above example is replaced by N,N-dimethylbenzyl amine; N,N-dimethylcyclohexyl amine; N-ethyl pyrrolidine; N-methyl piperidine; or N-methyl morpholine similar results are obtained.

EXAMPLE 2

The trimethylamine-chloroberyllium hydride complex was prepared in a manner similar to that of Example 1 by adding 9.5 grams of trimethylamine hydrochloride to 7.0 grams of the trimethylamine-beryllium hydride complex in 100 milliliters of benzene. Some unreacted solids remained and were filtered off. Material insoluble in cold benzene was recrystallized from hot benzene to give 6.0 grams of white crystals melting at 220 to 231° C. The product was analyzed, with the following results.

|  | Found | Theory for trimethylamine chloroberyllium hydride |
|---|---|---|
| H−, millimoles per gram, weight percent | 10.12(1.01) | 9.62(0.96) |
| Be | 10.13(9.14) | 9.62(8.60) |
| Cl | 9.34(34.1) | 9.62(34.9) |
| Amine | 9.34(55.6) | 9.62(56.5) |
| Molecular weight, dimer | 236 | 209 |

This complex doubtless also exists as a dimer in benzene solution.

When the trimethylamine of the beryllium hydride complex is replaced by dimethylethylamine, methyldiethylamine, triethylamine, dimethyl-n-propyl amine, dimethyl-n-hexyl amine, dimethyl-n-decyl amine or dimethyl-n-dodecyl amine, similar results are obtained.

Comparison of Examples 1 and 2 shows that in the former the amine components of the two reactants were different whereas in the latter they were identical. Normally it is desirable that the amines be identical since, if they are different, the product is not pure but a mixture. However, because of its volatility, trimethylamine can be used as in Example 1 with any significantly less volatile amine to produce a substantially pure product.

When the amine hydrochlorides of the above examples are replaced by the corresponding bromine and iodine derivatives, similar results are obtained.

The reactions of the amine-complex process are normally carried out in a solvent, which may be simply an excess of the pure amine reactant, but may also be an aromatic hydrocarbon or a saturated aliphatic hydrocarbon or a mixture thereof, which is liquid under reaction conditions. The solvents should be dry and free of traces of primary and secondary amines. The reactants of this process can be employed in proportions ranging from stoichiometric to a 10 percent or greater excess of the hydride reactant. Approximately stoichiometric proportions are preferred because an excess of either reactant leads to separation problems whose difficulty varies approximately as the amount of the excess. Purification, in general, is by fractional crystallization from an appropriate solvent but other methods may be used if desired.

The reaction temperature in this process can range from about −20° C. to about 180° C., being limited on the low side by the solubility of the complex and on the high side by the decomposition of the beryllium hydride. Ambient temperature is preferred because of the resulting ease of operation.

The reaction pressure is not at all critical and can range from 0.01 atmosphere or less to 10 atmospheres or more. For the sake of ease of manipulation, atmospheric pressure is preferred.

In view of the desirablity of maintaining an excess of the hydride reactant in the present reaction, the hydrochloride should be added slowly to an excess of the hydride reactant over a period ranging from 30 minutes or less to one hour or more at the end of which time reaction is essentially complete.

Halide-complex process

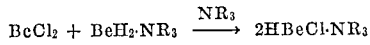

$$BeCl_2 + BeH_2 \cdot NR_3 \xrightarrow{NR_3} 2HBeCl \cdot NR_3$$

EXAMPLE 3

Beryllium hydride-N-methyl morpholine complex (11.2 parts) is placed in a 1-liter ball mill one-third full of half-inch balls and previously flushed with dry nitrogen. Two hundred parts of freshly distilled N-methyl morpholine are added. The mill is sealed and rotated briefly to dissolve the complex. The mill is then opened to permit the addition of 8.0 parts of freshly sublimed anhydrous beryllium chloride and resealed. Rotation of the mill is resumed and continued for twelve hours at ambient temperature.

The contents of the mill are then decanted through a filter and the residue washed on the filter with a small amount of N-methyl morpholine. The combined filtrate and washings are distilled under vacuum at 100 to 150° C. A white crystalline residue of chloroberyllium hydride-N-methyl morpholine complex is obtained. All operations are carried out under an atmosphere of dry nitrogen.

When the N-methyl morpholine of the foregoing reaction is replaced by trimethylamine, dimethylethylamine, methyldiethylamine, triethylamine, dimethyl-n-butylamine, dimethylisobutylamine, dimethyl-n-octylamine, dimethyl-n-nonylamine, N,N-dimethylbenzylamine, N,N-dimethylcyclohexylamine, N-methyl pyrrolidine, N-ethyl pyrrolidine or N-methyl piperidine, similar results are obtained. Furthermore, when the beryllium chloride of the above reaction is replaced by beryllium bromide or beryllium iodide, similar results are obtained.

In this process, excess amine is employed as reaction medium. The beryllium hydride complex is soluble in this medium whereas the beryllium chloride is insoluble. In view of the solubility of one of the reactants, the ball-milling operation of the above example can be replaced by any form of vigorous agitation. However the reaction solvent is not limited to an excess of the amine of the hydride complex. A mixture of the amine in any proportion with a liquid aromatic hydrocarbon can be used. Suitable hydrocarbons include benzene, toluene, the xylenes, mesitylene, p-cymene, pseudocumene, cumene and mixtures thereof.

The berryllium chloride and the hydride complex reactants of the present process can be combined in a wide variety of proportions ranging from a 100 percent or greater excess of the beryllium chloride reactant to a 100 percent or greater excess of the beryllium hydride complex reactant. For reasons of economy and ease of manipulation, an approximately stoichiometric proportion is preferred.

The reaction temperature can range from −20° C. or below to 180° C. or above, ambient temperature being preferred for reasons of ease of manipulation.

Here also the reaction pressure is not critical and can range from 0.01 atmosphere or below to 10 atmospheres or above, atmospheric pressure being preferred for the above reasons.

The reaction time can range from 6 hours or less to 24 hours or more depending upon the other reaction conditions. The order of addition of the reactants is immaterial, addition of the beryllium chloride to the hydride complex and the reverse order yielding equally satisfactory results.

Halide-hydride process

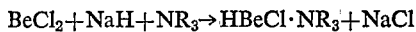

$$BeCl_2 + NaH + NR_3 \rightarrow HBeCl \cdot NR_3 + NaCl$$

EXAMPLE 4

A reactor is used which is provided with a stirrer, a reflux condenser protected by a drying tube, a gas inlet tube and a tube for charging solid materials. The stirrer is set in motion and the reactor is flushed with dry nitrogen and charged successively with 200 parts dry benzene, 100 parts distilled N-methyl piperidine, 81 parts of freshly sublimed beryllium chloride and 24 parts of pure, finely divided sodium hydride, the last being added slowly to avoid unduly vigorous reaction. The reaction mixture is heated to reflux and vigorous stirring is continued at reflux temperature for 24 hours. The reaction mixture is then cooled and filtered and the filtrate is evaporated under vacuum to produce a white crystalline residue of chloroberyllium hydride-N-methyl piperidine complex in good yield.

All operations are carried out under an atmosphere of dry nitrogen.

When the amine reactant of Example 4 is replaced by trimethylamine, dimethylethylamine, methyldiethylamine, triethylamine, dimethyl-n-propylamine, dimethyl-n-isoheptylamine, dimethyl-n-dodecylamine, N,N-dimethylbenzylamine, N,N - dimethylcyclohexylamine, N-methyl pyrrolidine, N-ethyl pyrrolidine or N-methyl morpholine, similar results are obtained, a closed system, however, being used with the more volatile amines to prevent their escape. When the beryllium chloride reactant of Example 4 is replaced by beryllium bromide or beryllium iodide, similar results are obtained.

The foregoing reaction may be carried out in a stirred reactor as indicated above or in a ball mill. The latter will be preferable in some instances owing to the insolubility of the chloride and hydride reactants and of the sodium chloride by-product. Inasmuch as the desired product is soluble in excess amine or in aromatic hydrocarbons, the use of these liquids as reaction media is desirable, not only for separation and purification of the product but for lending mobility to the reaction mixture. The amount of excess amine or of aromatic hydrocarbon can range from 20 percent or less to 100 percent or more, based on the solid reactants. Suitable aromatic hydrocarbons include benzene, toluene, the xylenes, mesitylene, p-cymene, pseudocumene, cumene and mixtures thereof.

The reaction temperature in the above process can range from −20° C. or below to 180° C. or above, the limits being set as before by the solubility of the complex and by decomposition of the beryllium hydride. Pressure is not critical and can range from 0.01 atmosphere or less to 10 atmospheres or more. For ease in manipulation, atmospheric pressure is preferred.

The reaction time can vary from six hours or less to 24 hours or more, depending upon the particular reactants employed.

Halogenation and hydrohalogenation processes $$X_2 + 2BeH_2 \cdot NR_3 \rightarrow 2HBeX \cdot NR_3 + H_2$$
$$HX + BeH_2 \cdot NR_3 \rightarrow H_2 + HeBeX \cdot NR_3$$

EXAMPLE 5

Anhydrous chlorine is bubbled slowly in the dark into an excess of a toluene solution of beryllium hydride-triethylamine complex using a flow meter to assure that the complex is always in excess. Refrigeration is employed to keep the reaction temperature continuously below ambient temperature. When reaction is complete, the temperature is allowed to rise to room temperature. The reaction mixture is filtered and the filtrate is evaporated under vacuum. A good yield of white crystalline chloroberyllium hydride-triethylamine complex is obtained.

All operations except the actual chlorination are carried out under an atmosphere of dry nitrogen.

When the triethylamine of the beryllium hydride reactant is replaced by trimethylamine, dimethylethylamine, methyldiethylamine, dimethyl-n-butylamine, dimethyliso-butylamine, dimethyl - n - hexylamine, dimethyl-n-octyl-amine, dimethyl-n-dodecylamine, N,N-dimethylbenzyl-amine, N,N-dimethylcyclohexylamine, N-methyl pyrrolidine, N-ethyl pyrrolidine, N-methyl piperidine, or N-methyl morpholine, similar results are obtained.

Moreover, when the chlorine reactant is replaced by bromine or iodine, similar results are obtained.

EXAMPLE 6

Anhydrous hydrogen chloride is bubbled into an excess of a benzene solution of beryllium hydride-N,N-dimethylbenzylamine complex using a flow meter to assure that the complex is always in excess. Hydrogen is evolved during the reaction. When the reaction is essentially complete, the reaction mixture is filtered and the filtrate is evaporated under vacuum. A good yield of white crystalline chloroberyllium hydride-N,N-dimethylbenzylamine complex is obtained.

When the N,N-dimethylbenzylamine of the beryllium hydride complex is replaced by trimethylamine, dimethyl-ethylamine, methyldiethylamine, triethylamine, dimethyl-n-butylamine, dimethylisobutylamine, dimethyl-n-hexyl-amine, dimethyl-n-octylamine, dimethyl-n-dodecylamine, N,N-dimethylcyclohexylamine, N-methyl pyrrolidine, N-ethyl pyrrolidine, N-methyl piperidine or N-methyl morpholine, similar results are obtained. Moreover when the hydrogen chloride reactant is replaced by hydrogen fluoride, hydrogen bromide or hydrogen iodide, similar results are obtained.

In the halogenation and hydrohalogenation processes the anhydrous halogen-containing reactant is metered slowly into an excess of the complex. The excess of the hydride complex can vary from five percent or less to 100 percent or more depending upon the other reaction conditions. The halogenation reaction is preferably carried out in the dark to avoid formation of free radicals and consequent halogenation of the amines. The use of an excess of the halogen-containing reactant is undesirable since it reduces the yields (but not necessarily the purity) of the product, inasmuch as the beryllium halide by-product is insoluble.

The reaction temperature can range from −20° C. or below to 100° C. or above but temperatures at or below room temperature are preferred in order to avoid excessive formation of by-product and consequent yield reduction.

In all of the reactions described above, the amines are pretreated by distillation from sodium aluminum hydride or similar reagent to remove moisture and traces of primary and secondary amines.

Beryllium halide is sublimed to produce highly reactive crystals of small particle size and correspondingly high surface area. The alkali metal hydride is finely divided and free of oxide coating.

The haloberyllium hydride-amine complexes of this invention are attractive intermediates for the production of a variety of compounds including pure beryllium hydride. This hydride is a useful component of propellants and can be decomposed thermally to pure metallic beryllium for use in alloys and as a chemical raw material. The above complexes can also be converted, by reaction with olefins, to organoberyllium halide-amine complexes. Moreover the complexes are valuable selective reducing agents, useful in the reduction of olefins to saturated hydrocarbons, of ketones to secondary alcohols, of aldehydes to primary alcohols, of nitriles to amines and of esters to aldehydes or alcohols, depending upon the stoichiometry employed.

I claim:

1. The process for the preparation of a complex compound of a haloberyllium hydride with a tertiary amine, said compound being represented by the formula $$HBeX \cdot A$$

wherein X is a halogen of atomic number from 17 to 53, inclusive, and A is a tertiary amine selected from the group consisting of trimethyl amine, dimethylethyl amine, methyldiethyl amine, triethyl amine, N,N-dimethylbenzyl amine, N,N-dimethylcyclohexyl amine, N-methyl pyrrolidine, N-ethyl pyrrolidine, N-methyl piperidine, N-methyl morpholine and amines of the formula $$Me_2NR$$

wherein Me represents the methyl radical and R a saturated straight-chain alkyl radical containing from 3 to 12 carbon atoms, inclusive, which comprises reacting a beryllium halide of the formula $$BeX_2$$

with at least a stoichiometrically equivalent quantity of a tertiary amine-beryllium hydride complex of the formula $$A \cdot BeH_2$$

said tertiary amine-beryllium hydirde complex being dissolved in an excess of dry amine A, and the reaction being carried out at a temperature in the range of from about −20° to about 180° C., at a pressure of from about 0.01 atmosphere to about 10 atmospheres absolute, sufficient to maintain amine A in the liquid state at reaction temperature, and under an atmosphere inert with respect to both reactants and products, and separating said haloberyllium hydride-tertiary amine complex from the reaction product.

2. The process for the preparation of a complex compound of a haloberyllium hydride with a tertiary amine, said compound being represented by the formula $$HBeX \cdot A$$

wherein X is a halogen of atomic number from 17 to 53, inclusive, and A is a tertiary amine selected from the group consisting of trimethyl amine, dimethylethyl amine, methyldiethyl amine, triethyl amine, N,N-dimethylbenzyl amine, N,N-dimethylcyclohexyl amine, N-methyl pyrrolidine, N-ethyl pyrrolidine, N-methyl piperidine, N-methyl morpholine, and amines of the formula $$Me_2NR$$

wherein Me represents the methyl radical and R a saturated, straight-chain alkyl radical containing from 3 to 12 carbon atoms, inclusive, which comprises introducing a gaseous reactant selected from the group consisting of anhydrous hydrogen halides of the formula HX and anhydrous halogens of the formula $X_2$ into a solution of at least a stoichiometrically equivalent quantity of a beryllium hydride-tertiary amine complex of the formula $$A \cdot BeH_2$$

in a dry solvent selected from the group consisting of amine A and aromatic and saturated aliphatic hydrocarbons which are liquid under the reaction conditions, the reaction being carried out at a temperature in the range of from about −20° to about 100° C. at a pressure of from about 0.01 atmosphere to about 10 at atmospheres absolute and under an atmosphere inert with respect to both reactants and products, and separating said haloberyllium hydride-tertiary amine complex from the reaction product.

3. The process for the preparation of a complex compound of a haloberyllium hydride with a tertiary amine, said compound being represented by the formula $$HBeX \cdot A$$

wherein X is a halogen of atomic number from 17 to 53, inclusive, and A is a tertiary amine selected from the group consisting of trimethyl amine, dimethylethyl amine, methyldiethyl amine, triethyl amine, N,N-dimethylbenzyl amine, N,N-dimethylcyclohexyl amine, N-methyl pyrrolidine, N-ethyl pyrrolidine, N-methyl piperidine, N-methyl morpholine and amines of the formula $$Me_2NR$$

wherein Me represents the methyl radical and R is a saturated straight-chain alkyl radical containing from 3 to 12 carbon atoms, inclusive, which comprises reacting an anhydrous beryllium halide of the formula $$BeX_2$$

with at least a stoichiometrically equivalent quantity of an alkali metal hydride and with an excess of amine A at ambient temperature and pressure in a ball or rod mill and under an atmosphere inert with respect to both reactants and products, and separating said haloberyllium hydride-tertiary amine complex from the reaction product.

4. The process of claim 2 wherein said gaseous reactant is an anhydrous hydrogen halide.

5. The process of claim 2 wherein said gaseous reactant is an anhydrous halogen.

No references cited.

ALEX MAZEL, Primary Examiner

J. TOVAR, Assistant Examiner

U.S. Cl. X.R.

260— 293, 326.8, 563, 570.9, 583

PO-1050
(5/69)

UNITED STATES PATENT OFFICE
CERTIFICATE OF CORRECTION

Patent No. 3,555,020        Dated     January 12, 1971

Inventor(s)    Lawrence H. Shepherd, Jr.

It is certified that error appears in the above-identified patent and that said Letters Patent are hereby corrected as shown below:

Column 1, line 19 reads "N,N - dimethylcyclohexylamine," should read -- N,N-dimethylcyclohexylamine, --; line 22 reads "emine-beryl-", should read -- amine-beryl- --, Line 41 reads "of a novel", should read -- of novel --; line 51 reads "from 17", should read -- from 17 to --; line 56 reads "dimethylalkyl amine", should read -- dimethylalkyl amines --; line 60 reads "N - ethyl pyrrolidine, N - methyl piperidine,", should read -- N-ethyl pyrrolidine, N-methyl piperidine, --; line 71 reads "metay", should read -- metal Column 2, line 23 reads "nitrogen in the", should read -- nitrogen is the --; line 32 reads "$R_3N \cdot HX + BeH_2 \cdot NR_3 \rightarrow HBeX \cdot NR_3 + H_2 + HR_3$", should read -- $R_3N \cdot HX + BeH_2 \cdot NR_3 \rightarrow HBeX \cdot NR_3 + H_2 + NR_3$ --. Column 3, line 62 reads "$BcCl_2 + BeH_2 \cdot NR_3 \xrightarrow{NR_3} 2HBeCl \cdot NR_3$", should read -- $BeCl_2 + BeH_2 \cdot NR_3 \xrightarrow{NR_3} 2HBeCl \cdot NR_3$ --. Column 4, line 9 reads "dimethyl - n butyl-", should read -- dimethyl-n-butyl- --, line 75 reads "N,N - dimethylcyclohexylamine,", should read -- N,N-dimethyl cyclohexylamine, --. Column 5, line 52 reads, "dimethyl - n hexylamine," should read -- dimethyl-n-hexylamine --. Column 6, line 69 reads "hydrirde", should read -- hydride - Column 7, line 32 reads "10 at atmos-", should read -- 10 atmos- --.

Signed and sealed this 4th day of May 1971.

(SEAL)
Attest:

EDWARD M. FLETCHER, JR.          WILLIAM E. SCHUYLER,
Attesting Officer                  Commissioner of Paten